(12) United States Patent
Mandewalkar et al.

(10) Patent No.: US 11,398,781 B2
(45) Date of Patent: Jul. 26, 2022

(54) POWER SUPPLY UNIT, SYSTEM AND METHOD FOR COALESCENCE OF MULTI-PHASE LIQUID MIXTURES

(71) Applicant: Schlumberger Technology Corporation, Sugar Land, TX (US)

(72) Inventors: Pavan Kumar B. Mandewalkar, Houston, TX (US); Gary W. Sams, Spring, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 125 days.

(21) Appl. No.: 16/674,890

(22) Filed: Nov. 5, 2019

(65) Prior Publication Data

US 2021/0135579 A1  May 6, 2021

(51) Int. Cl.
*H02M 1/084* (2006.01)
*H02M 3/335* (2006.01)
*G05F 1/577* (2006.01)
*H05B 45/37* (2020.01)

(52) U.S. Cl.
CPC ........ *H02M 3/33507* (2013.01); *G05F 1/577* (2013.01); *H05B 45/37* (2020.01); *H02M 1/084* (2013.01); *H02M 1/0845* (2013.01)

(58) Field of Classification Search
CPC ............................ H02M 1/084; H02M 1/0845
USPC .................................................. 323/271, 272
See application file for complete search history.

(56) References Cited

U.S. PATENT DOCUMENTS

| | | | | |
|---|---|---|---|---|
| 3,772,180 A | * | 11/1973 | Prestridge | C10G 33/02 204/663 |
| 4,400,253 A | * | 8/1983 | Prestridge | B01D 17/06 204/555 |
| 4,417,971 A | * | 11/1983 | Ferrin | B01D 17/06 204/663 |
| 6,860,979 B2 | * | 3/2005 | Sams | B01D 17/00 204/556 |
| 7,434,737 B2 | | 10/2008 | Zmood | |
| 7,609,040 B1 | * | 10/2009 | Jain | H02M 3/1584 323/276 |
| 8,357,283 B2 | | 1/2013 | Kao | |
| 2009/0267658 A1 | * | 10/2009 | Bridge | H02M 3/1584 327/141 |

(Continued)

FOREIGN PATENT DOCUMENTS

| | | |
|---|---|---|
| CN | 102005937 A | 4/2011 |
| CN | 206613217 U | 11/2017 |

OTHER PUBLICATIONS

International Search Report and Written Opinion of PCT Application No. PCT/US2020/058872 dated Apr. 9, 2021, 7 pages.

*Primary Examiner* — Gary A Nash
(74) *Attorney, Agent, or Firm* — Helene Raybaud

(57) ABSTRACT

A power supply device includes a power conversion circuit configured to generate an output voltage from an input voltage, and a controller coupled to the power conversion circuit and configured to control the power conversion circuit to generate the output voltage for causing or enhancing coalescence of a multi-phase liquid mixture when the output voltage is applied to the multi-phase liquid mixture. The controller is configured to control generation of the output voltage in accordance with a synchronization signal. The controller is further configured to generate the synchronization signal and transmit the synchronization signal to another power supply device, or receive the synchronization signal from another power supply device.

20 Claims, 7 Drawing Sheets

(56) References Cited

U.S. PATENT DOCUMENTS

| | | | | |
|---|---|---|---|---|
| 2013/0293210 | A1* | 11/2013 | Smith | H02M 3/1584 323/282 |
| 2013/0328394 | A1* | 12/2013 | Guittonneau | B60R 16/03 307/10.1 |
| 2014/0125384 | A1* | 5/2014 | Ounadjela | H04B 11/00 327/108 |
| 2015/0218929 | A1* | 8/2015 | Narasimhan | G01V 11/002 175/45 |
| 2015/0290559 | A1* | 10/2015 | Collins, Jr. | B01D 17/12 204/555 |
| 2016/0190803 | A1 | 6/2016 | Uno | |
| 2018/0262111 | A1* | 9/2018 | Taniguchi | H02M 3/1584 |

\* cited by examiner

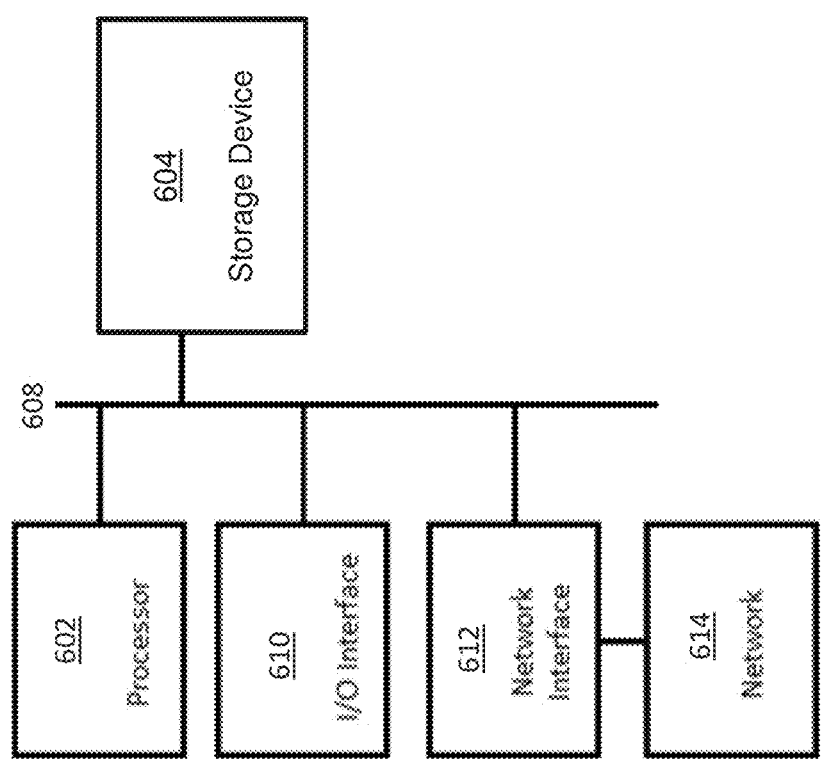

POWER SUPPLY UNIT, SYSTEM AND METHOD FOR COALESCENCE OF MULTI-PHASE LIQUID MIXTURES

FIELD

Embodiments of the present application generally relate to power supply unit, system and method for coalescence of multi-phase liquid mixtures. A practical application involves coalescence of water droplets in an oil multi-phase liquid mixture for separation of crude oil and water.

BACKGROUND

Separation of crude oil from produced water, especially when the fluid is a multi-phase liquid mixture with small droplets of water suspended in an oil base, is a common concern in the petroleum industry. A known technique for separating water from oil, using electrical coalescence is described in U.S. Pat. No. 6,860,979, the entirety of which is incorporated by reference herein.

SUMMARY

In at least one embodiment, a power supply device comprises a power conversion circuit configured to convert an input voltage into an output voltage, and a controller coupled to the power conversion circuit and configured to control the power conversion circuit to generate the output voltage for causing coalescence of a multi-phase liquid mixture when the output voltage is applied to the multi-phase liquid mixture. The controller is configured to control a timing of generation of the output voltage in accordance with a synchronization signal. The controller is further configured to generate the synchronization signal and transmit the synchronization signal to a further power supply device, or receive the synchronization signal from another power supply device.

In at least one embodiment, a system comprises a plurality of power supply devices each configured to convert an input voltage into an output voltage for causing coalescence of a multi-phase liquid mixture when the output voltage is applied to the multi-phase liquid mixture. The plurality of power supply devices comprises a master power supply device and at least one slave power supply device. The master power supply device is configured to generate a synchronization signal, control a timing of generation of the output voltage from the master power supply device in accordance with the synchronization signal, and transmit the synchronization signal to the at least one slave power supply device. The at least one slave power supply device is configured to receive the synchronization signal from the master power supply device, and synchronize a timing of generation of the output voltage from the at least one slave power supply device with the timing of generation of the output voltage from the master power supply device in accordance with the received synchronization signal.

In a method in accordance with at least one embodiment, a master power supply device among a plurality of power supply devices generates a synchronization signal, and transmits the synchronization signal to at least one slave power supply device among the plurality of power supply devices. Each of the master power supply device and the at least one slave power supply device generates an output voltage in synchronization with the synchronization signal. The generated output voltages are applied to a plurality of electrodes arranged in a vessel and coupled to the plurality of power supply devices, respectively, for causing coalescence of a multi-phase liquid mixture in the vessel under application of the output voltages.

In at least one embodiment, a system comprises a vessel having at least one electrode therein and a power supply device. The power supply device comprises a power conversion circuit coupled to the at least one electrode, and a microprocessor coupled to the power conversion circuit. The microprocessor is configured to control the power conversion circuit to generate, from an input voltage, an output voltage to be supplied to the at least one electrode to enhance coalescence of a multi-phase liquid mixture in the vessel. The power conversion circuit and the microprocessor are incorporated on a same board or accommodated inside a same housing of the power supply device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is a block diagram of a controller, in accordance with some embodiments.

DETAILED DESCRIPTION

Figure 1:
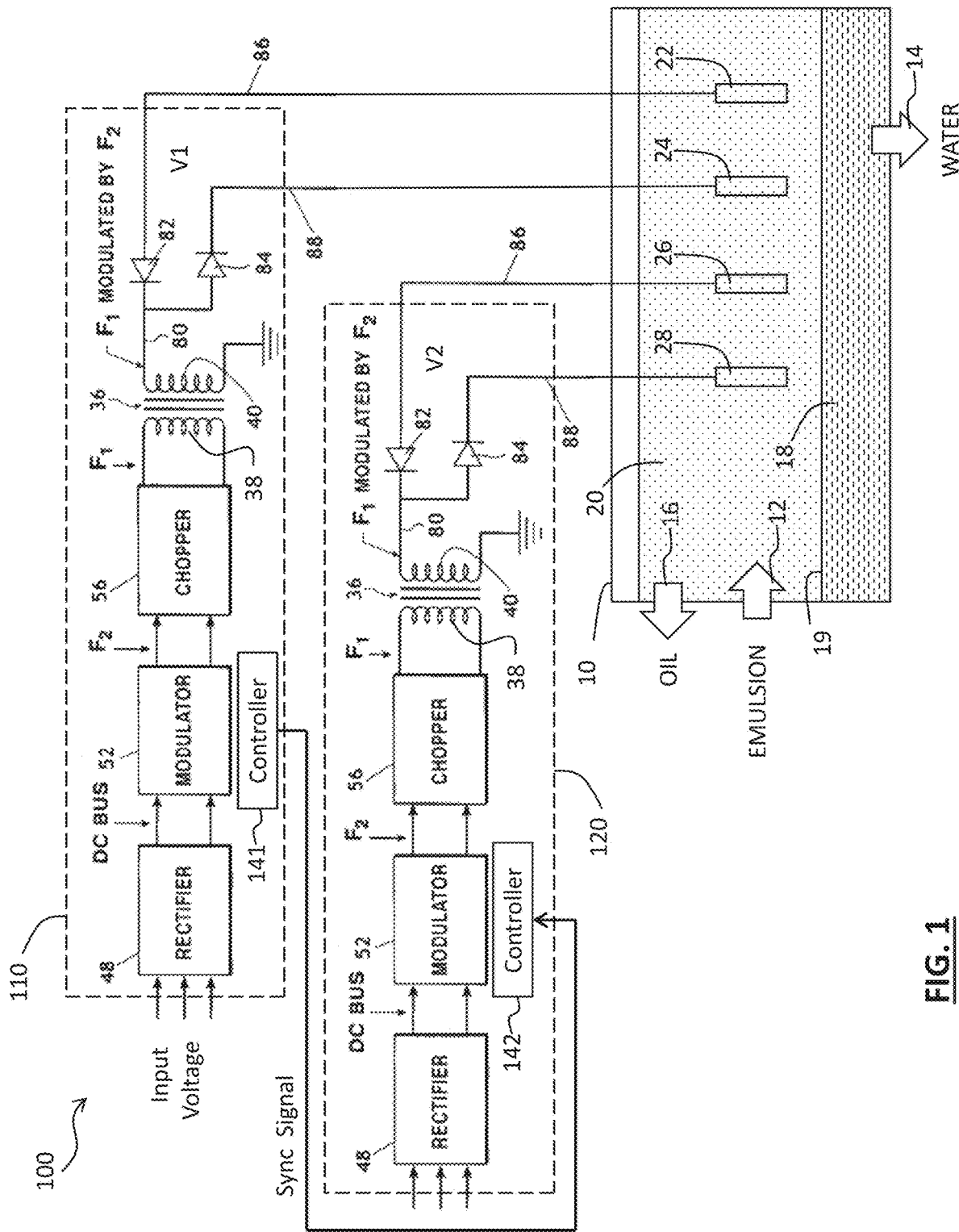
FIG. 1 is a schematic diagram of a system for coalescence of a multi-phase liquid mixture, in accordance with some embodiments.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Electrodes are installed in a vessel containing a multi-phase liquid mixture, and are connected to one or more power supply devices that output voltages to cause or enhance coalescence of the multi-phase liquid mixture in the vessel. The mixture is flowed into the vessel, is separated in the vessel under the influence of the voltage maintained by the electrodes, and at least two separate liquid streams flow out of the vessel, each stream containing substantially all of one phase of the multi-phase mixture. When multiple power supply devices are deployed for outputting voltages to electrodes in a single vessel, the load (i.e., the multi-phase liquid mixture) is common among the power supply devices. This common load defines an electrical circuit connecting the outputs (i.e., the electrodes) of the multiple power supply devices. Potential differences among the electrodes can result in an electrical current flowing to or from one or more of the power supply device through the common load. This situation may potentially damage the power supply devices and/or reduce the multi-phase liquid mixture treatment performance.

In some embodiments, the power supply devices are synchronized by a synchronization signal generated by one of the power supply devices, so that the output voltages of the power supply devices are generated with no offset therebetween, or with an offset at or below a predetermined value, thus avoiding potential damage or disruption of a power supply unit.

FIG. 1 is a schematic diagram of a system 100 for coalescence of a multi-phase liquid mixture, in accordance with some embodiments. An example of a multi-phase liquid mixture is an emulsion. The system 100 includes a vessel 10 having an emulsion inlet 12, a heavier component (e.g., water) outlet 14, and a lighter component (e.g., oil) outlet 16. The system 100 further includes a plurality of electrodes 22, 24, 26, 28 arranged in the vessel 10, and a plurality of power supply devices 110, 120 electrically coupled to the electrodes 22, 24, 26, 28 for applying output voltages V1, V2 to the electrodes 22, 24, 26, 28 for causing coalescence of the multi-phase liquid mixture in the vessel 10.

In some embodiments, the multi-phase liquid mixture is crude oil mixed with produced water and coalescence is used to augment the separation of the produced water from the crude oil. In the example configuration in FIG. 1, water is a heavier component 18 and is discharged through the heavier component outlet 14, whereas oil is a lighter component 20 and is discharged through the lighter component outlet 16. In another example (not shown), the crude oil is a heavy oil multi-phase liquid mixture in which the emulsified water component is lighter than the hydrocarbon component. In such example, water is the lighter component and is discharged through the lighter component outlet 16, whereas oil is the heavier component and is discharged through the heavier component outlet 14. Although embodiments specifically described herein are directed to coalescence of crude oil, other multi-phase liquid mixtures having heavier and lighter components to be separated by coalescence are within the scopes of various embodiments. Generally, liquids that separate into separate phases will have electrical characteristics that are different enough to support enhanced separation by application of electric fields. The methods and apparatus described herein can be used to separate such liquids.

In some embodiments, the electrodes 22, 24, 26, 28 are perforated and are positioned within the vessel 10 so that the multi-phase liquid mixture supplied from the emulsion inlet 12 passes through and between the electrodes 22, 24, 26, 28.

The electrodes 22, 24, 26, and 28 are shown here in a vertical orientation within the vessel 10, but the electrodes 22, 24, 26, and 28 may each be in any convenient orientation, horizontal, vertical, or angled between horizontal and vertical, which may be different for each electrode. The output voltages V1, V2 applied from the power supply devices 110, 120 to the electrodes 22, 24, 26, 28 form an electric field above an oil/water interface 19 for causing coalescence of the multi-phase liquid mixture for augmenting the separation of heavier and lighter components of the multi-phase liquid mixture. In at least one embodiment, the vessel 10 is grounded. The number and/or arrangement of the electrodes 22, 24, 26, 28 in the vessel 10 and/or the number of the power supply devices 110, 120 shown here are examples, and other configurations and combinations of power supply devices and electrodes can be used.

In some embodiments, the power supply devices 110 and 120 have similar configurations. The power supply device 110 is described in detail herein. The description of the power supply device 110 applies also to the power supply device 120, unless indicated otherwise. The power supply device 110 includes a rectifying circuit (or rectifier) 48, a modulating circuit (or modulator) 52, a chopper circuit (or chopper) 56, a transformer 36 having a primary winding 38 and a secondary winding 40, and a controller 141, e.g., a DSP (digital signal processor) or a microprocessor.

An input voltage, e.g., a single-phase or a three-phase voltage, is input into the rectifier 48 which is configured to output a rectified voltage on a DC bus coupled to an output of the rectifier 48. In an example, the rectifier 48 includes a rectifying a bridge circuit of diodes. When the input voltage is a three-phase voltage, the bridge circuit is a three-phase bridge circuit.

Figure 2A:
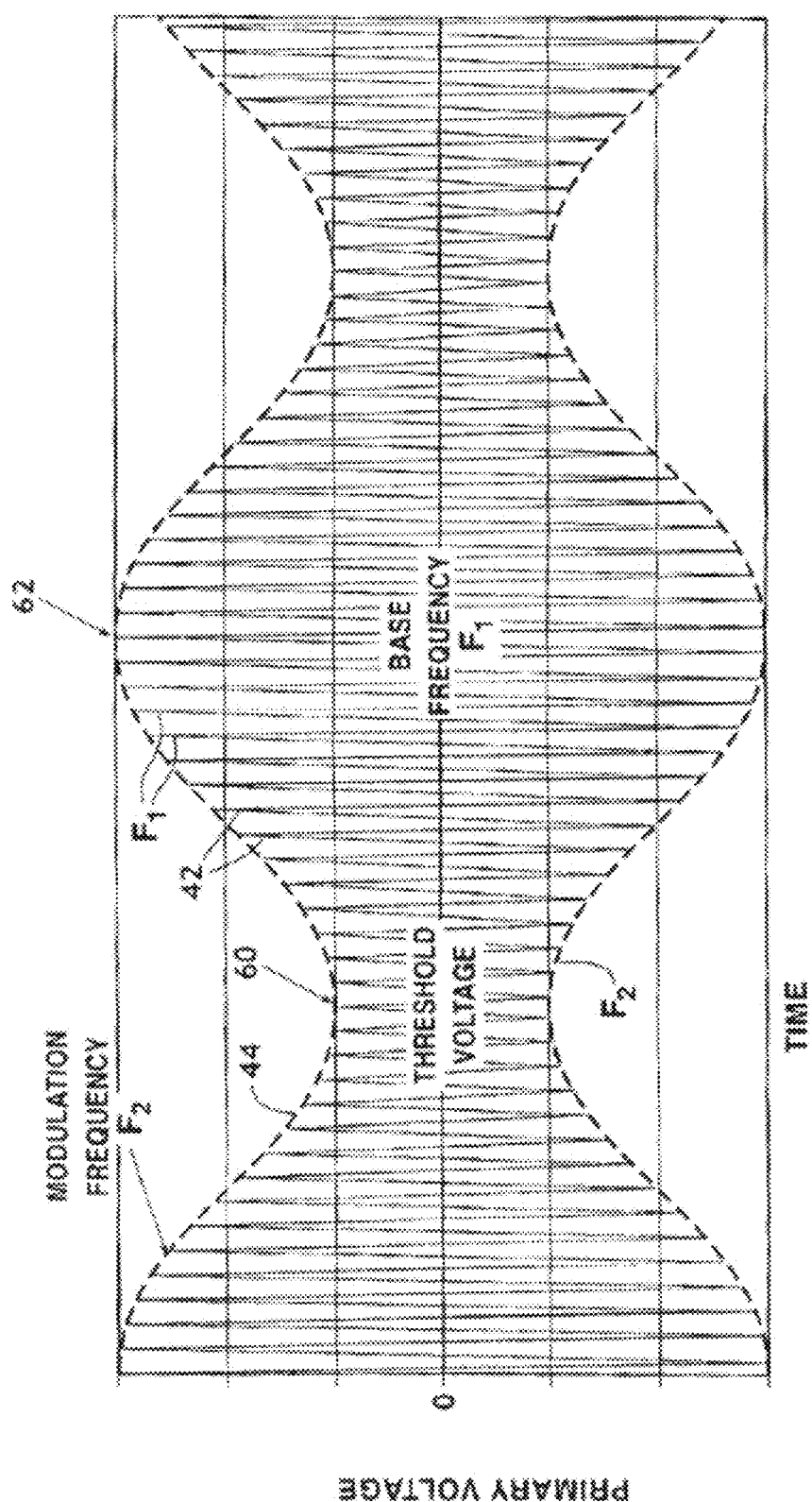
FIGS. 2A-2C are example waveforms of several voltages in the system of FIG. 1.

The modulator 52 is coupled to the output of the rectifier 48 through the DC bus, and is configured to modulate the rectified voltage in accordance with a modulation frequency signal (e.g., at a modulation frequency $F_2$) to obtain a modulated voltage. In an example, the modulator 52 includes one or more diodes and/or switching elements (or switches) and/or inductors. Examples of switches include, but are not limited to, IGBT (insulated-gate bipolar transistor), BJT (bipolar junction transistor), MOSFET (metal oxide field effect transistor), thyristor, GTO (gate turn-off thyristor), etc. The switches are controlled to be ON or OFF by the controller 141 to perform signal modulation on the rectified voltage to output the modulated voltage. An example waveform 44 of the modulated voltage having the modulation frequency $F_2$ is shown in FIG. 2A.

The chopper 56 is coupled to the output of the modulator 52, and configured to chop-up the modulated voltage in accordance with a base frequency signal (e.g., at a base frequency $F_1$) to obtain a chopped-up voltage. The base frequency is higher than the modulation frequency. In an example, the chopper 56 includes one or more switching elements (or switches). Examples of switches include, but are not limited to, IGBT, BJT, MOSFET, thyristor, GTO, etc. The switches are controlled to be ON or OFF by the controller 141 to chop-up the modulated voltage to output the chopped-up voltage. An example waveform 42 of the chopped-up voltage having the base frequency $F_1$ is shown in FIG. 2A.

Figure 2B:
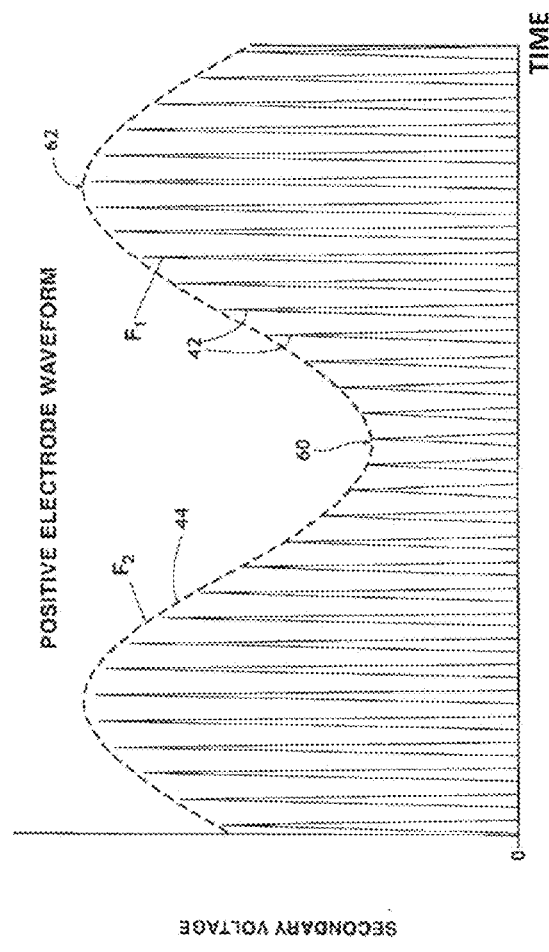
Figure 2C:
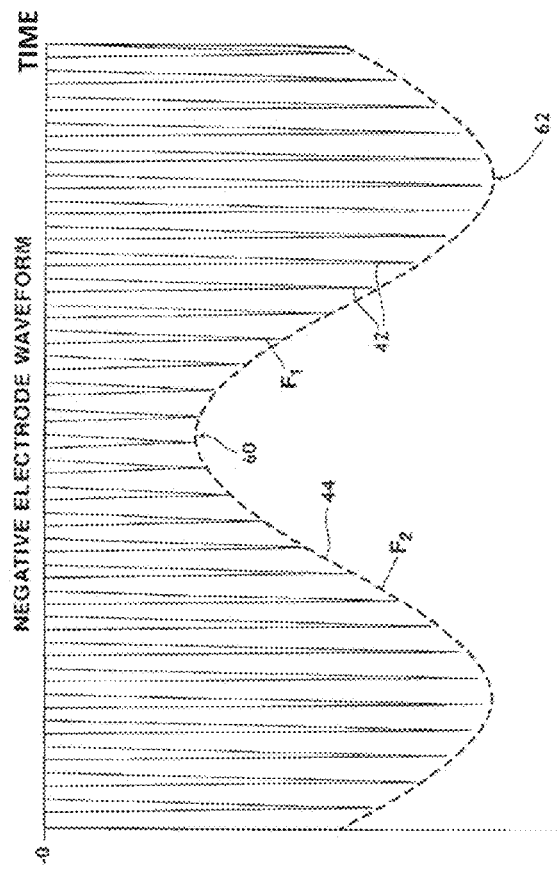

The primary winding 38 of the transformer 36 is coupled to the output of the chopper 56 to receive the chopped-up voltage. The chopped-up voltage is stepped up on the secondary winding 40 of the transformer 36, at an output 80, as the output voltage V1. The output voltage V1 is supplied, via an output rectifier formed by diodes 82, 84, to the corresponding electrodes 22, 24 in the vessel 10, to cause or enhance coalescence of the multi-phase liquid mixture in the vessel 10. Example waveforms of the output voltage V1 applied to the electrodes 24, 22, via diodes 84, 82, respectively, are shown in FIGS. 2B, 2C, respectively. In at least one embodiment, the output rectifier including the diodes 82, 84 is omitted.

In some embodiments, the controller 141 includes a processor, a memory and a network and/or I/O interface for data exchange with other equipment. An example configuration of the controller 141 is given in FIG. 6 described herein. The controller 141 is configured to control operation, for example, switching operation of various switches, in at least the modulator 52 and chopper 56, to obtain an intended waveform for the output voltage. Operation parameters used by the controller 141 to for operation control include, but are not limited to, base frequency $F_1$, modulation frequency $F_2$, minimum amplitude 60, maximum amplitude 62, and shape of the waveform 44 of the modulated voltage. The base frequency $F_1$ is the minimum frequency required to prevent the full discharge of dispersed water droplets. The modulation frequency $F_2$ is the natural frequency of the largest water droplet that will form at the minimum amplitude 60 of the output voltage. The minimum amplitude 60 is related to a threshold voltage (FIG. 2A) and is the lowest voltage applied to the electrodes at the modulation frequency $F_2$. The threshold voltage is the lowest voltage level with sufficient energy to initiate coalescence of dispersed water from a multi-phase liquid mixture of oil and water. The maximum amplitude 62 is related to a critical voltage and is the highest voltage applied to the electrodes at the modulation frequency $F_2$. The critical voltage is the highest voltage which permits coalesced water droplets to separate. Exceeding the critical voltage results in a reduction in the water droplet diameters and stops separation of water from oil. The shape of the waveform 44 is not necessarily a sine wave as shown, but may be any other shapes including, but not limited to, square, trapezoidal, triangular, exponential, logarithmic, semi-circular, symmetrical, non-symmetrical shapes. The operation parameters depend on one or more characteristics of the multi-phase liquid mixture subject to electrical coalescence, and are adjustable either by/at the controller 141 or via control signals supplied to the controller 141. In an example, the modulation frequency $F_2$ is in a range of 1 to 100 Hz, the base frequency $F_1$ is in a range of 60 to 2500 Hz, a minimum amplitude of the output voltage is in a range of 10 kV to 20 kV, and a maximum amplitude of the output voltage is in a range of 25 kV to 60 kV.

The power supply device 120 has configuration and operation similar to the power supply device 110. In some embodiments, the operation parameters applied by a controller 142 of the power supply device 120 to control the corresponding rectifier, modulator and/or chopper are the same as those applied by the controller 141 of the power supply device 110. As a result, the output voltage V2 supplied by the power supply device 120 to the corresponding electrodes 26, 28 have the same maximum/minimum amplitudes, frequencies and waveform shape as the output voltage V1 supplied by the power supply device 110 to the corresponding electrodes 22, 24. However, as discussed herein, even though the output voltages V1 and V2 may have the same maximum/minimum amplitudes, frequencies and waveform shape, there is a concern that an offset in time exists between the output voltages V1 and V2, such that the output voltages V1 and V2 are out of phase. In some examples where the output voltages V1, V2 vary in a large range of tens kV at a high frequency of a few kHz, even a small offset in time may result in a large momentary voltage difference across the electrodes coupled to the power supply devices 110, 120, which in turn, may cause a large current impulse from one power supply device into the other power supply device. This situation may potentially damage the power supply devices and/or reduce the multi-phase liquid mixture treatment performance.

To address the above concern, the power supply devices 110, 120 are synchronized so that the output voltages V1, V2 are generated with no offset therebetween or with an offset in time at or below a predetermined value, in at least one embodiment. For this purpose, the controller 141 generates and transmits a synchronization signal to the controller 142. Both controllers 141, 142 are configured to control the other components of the power supply devices 110, 120 to generate the output voltages V1, V2 in synchronization with the synchronization signal. In some embodiments, the synchronization signal includes a plurality of synchronization pulses generated and transmitted periodically, to keep the power supply devices 110, 120 in synchronization. As a result, an offset between the output voltages V1, V2 is eliminated, or at least contained to be at or below a predetermined value, in at least one embodiment. For example, with the base frequency $F_1$ at about 800 Hz, an offset in time at or below 0.1 millisecond (ms) is acceptable. For another example, with the base frequency $F_1$ at about 1600 Hz, an offset at or below 0.01 ms is acceptable.

Figure 3:
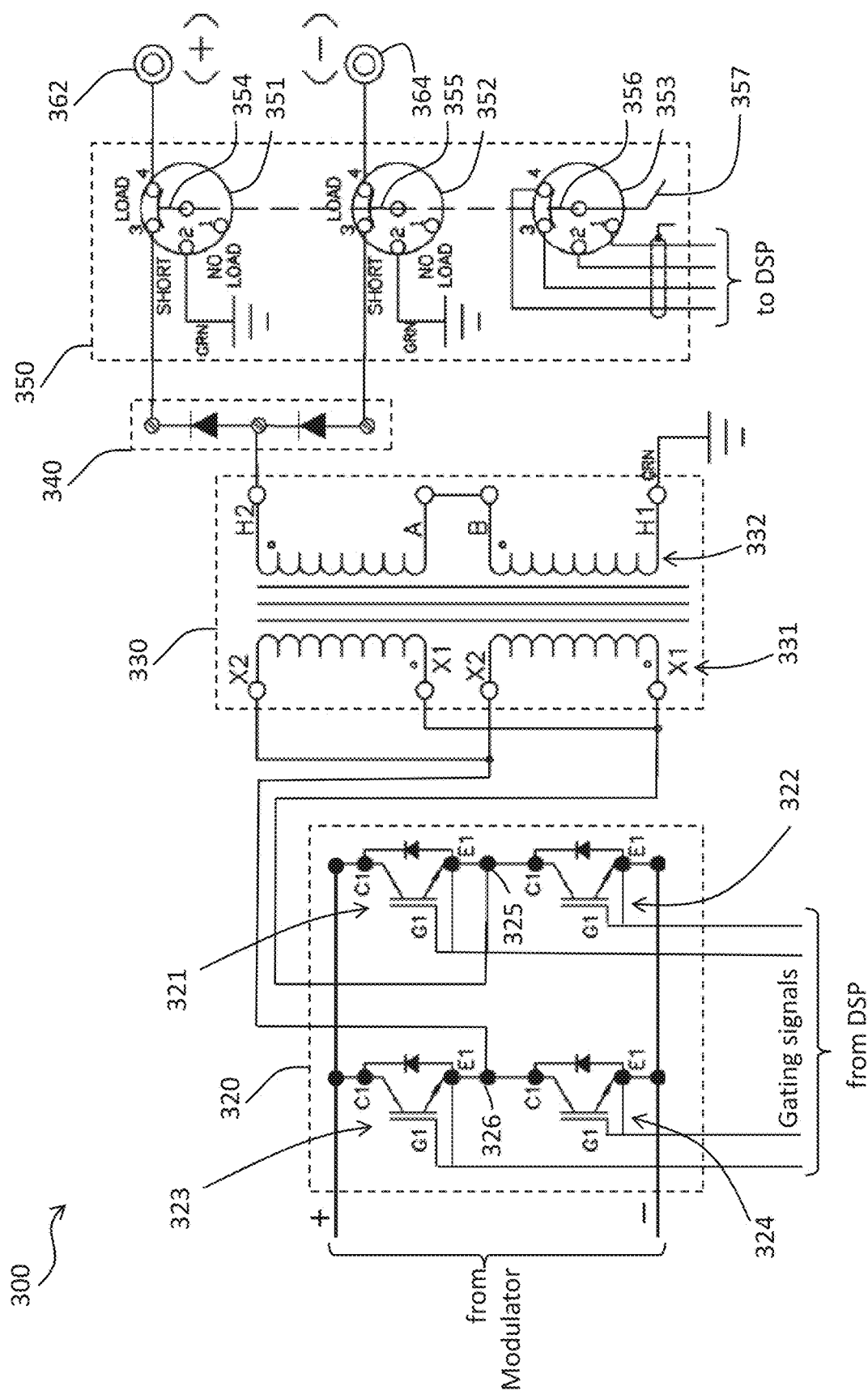
FIG. 3 is a circuit diagram of a part of a power supply device, in accordance with some embodiments.

FIG. 3 is a circuit diagram of a part of a power supply device 300, in accordance with some embodiments. In at least one embodiment, the power supply device 300 corresponds to the power supply device 110 and/or the power supply device 120 of the system 100 in FIG. 1. In the part shown in the example configuration of FIG. 3, the power supply device 300 includes a chopper 320, a transformer 330, an output rectifier 340, and an output switch 350. The power supply device 300 further includes a rectifier (not shown), a modulator (not shown), and a controller (not shown), as described in connection with FIG. 1.

In some embodiments, the chopper 320 corresponds to the chopper 56 of the system 100. The modulator of the power supply device 300 supplies a modulated voltage to the chopper 320 in a manner similar to the modulator 52 of the system 100. The chopper 320 includes a bridge circuit of four IGBTs 321, 322, 323, 324. Each of the IGBTs 321, 322, 323, 324 has a gate G1 coupled to an emitter E1, and a collector C1. The gate G1 and emitter E1 are further coupled to the controller, e.g., a DSP (or a microprocessor), of the power supply device 300 to receive gating signals from the DSP.

The transformer 330 includes a primary winding 331 and a secondary winding 332. The primary winding 331 includes two coils. A first end X1 of each of the two coils of the primary winding 331 is coupled to a node 325 between the emitter of the IGBT 321 and the collector of the IGBT 322. A second end X2 of each of the two coils of the primary winding 331 is coupled to a node 326 between the emitter of the IGBT 323 and the collector of the IGBT 324. The secondary winding 332 includes first and second coils. An end A of the first coil is coupled to an end B of the second coil. The other end H2 of the first coil is coupled to a midpoint between two diodes of the output rectifier 340. The other end H1 of the second coil is grounded.

The output rectifier 340 includes two diodes coupled serially, in a manner similar to diodes 82, 84 in the power supply device 110, 120. In some embodiments, the output rectifier 340 is omitted.

The output switch 350 includes three contact sets 351, 352, 353. Each of the contact sets 351, 352, 353 includes a plurality of fixed contacts numbered as 1, 2, 3, 4, and a plurality of moving contacts 354, 355, 356. The moving contacts 354, 355, 356 are physically coupled to a handle 357 to be moved together by a movement of the handle 357. The handle 357 is located outside a housing of the power supply device 300, and configured to be operated manually by a human operator, with or without power assistance from an actuator such as a motor or an air cylinder, to switch the output switch 350 through a plurality of states, including, but not limited to, a load state, a short-circuit state, and a no-load state. In at least one embodiment, the actuator is remotely and/or automatically controllable.

In the load state shown in FIG. 3, the moving contacts 354, 355, 356 are in a first physical position and electrically connect the fixed contacts numbered 3 and 4 of the contact sets 351, 352, 353. This is a normal operation state in which the output voltage at the output rectifier 340 is supplied to terminals 362, 364 to be further supplied to corresponding electrodes in a vessel with a multi-phase liquid mixture to be treated. A signal indicating the load state is generated by the connection between the fixed contacts numbered 3 and 4 of the contact set 353, and is supplied to the DSP.

When the handle 357 is operated, the moving contacts 354, 355, 356 are moved, e.g., rotated counterclockwise, to a second physical position and electrically connect the fixed contacts numbered 2 and 3 of the contact sets 351, 352, 353. This is the short-circuit state in which the output at the output rectifier 340 is grounded, via the grounded fixed contacts numbered 2 of the contact sets 351, 352. The power supply device 300 remains connected to the input voltage and operates as in the normal operation. A purpose of this short-circuit state is to replicate a fault on the load side, e.g., in the vessel, for testing purposes. A signal indicating the short-circuit state is generated by the connection between the fixed contacts numbered 2 and 3 of the contact set 353, and is supplied to the DSP.

When the handle 357 is further operated, the moving contacts 354, 355, 356 are moved, e.g., rotated further counterclockwise, to a third physical position and electrically connect the fixed contacts numbered 1 and 2 of the contact sets 351, 352, 353. This is the no-load state in which the output at the output rectifier 340 is electrically isolated from the terminals 362, 364, and thus from the corresponding electrodes in the vessel. When in the no-load state, the power supply device 300 can be shut down to determine whether a fault detected during normal operation occurred in the vessel or in the power supply device 300. A signal indicating the no-load state is generated by the connection between the fixed contacts numbered 1 and 2 of the contact set 353, and is supplied to the DSP.

In some embodiments, use of an output switch 350 with a no-load state permits simple and quick isolation of the power supply device 300 from the vessel, e.g., for troubleshooting and/or maintenance, with no special tool required. This is an improvement over other approaches in which a specialized technician with special tools are required to isolate a faulty power supply device from a vessel, and it may take a day to a week time to carry out a simple troubleshooting technique. The output switch can also be used to stage startup of power supply devices by energizing the power circuits of a power supply device, and then operating the output switch to place the power supply device in electrical contact with the electrodes in the vessel. In some embodiments, the output switch 350 is omitted.

In the normal operation, the DSP is configured to supply the gating signals to control the IGBTs 321, 322, 323, 324 to sequentially switch ON or OFF to chop-up the modulated voltage in synchronization with a synchronization signal. The timing or phase of the gating signals corresponds to the timing or phase of the chopped-up voltage generated by the chopper 320, and also corresponds to the timing or phase of the output voltage generated by the power supply device 300. In a system with multiple power supply devices 300 connected to electrodes in a vessel, by synchronizing the gating signals, supplied from respective DSPs to the respective choppers 320, with the synchronization signal, the timing of generation of output voltages of the multiple power supply devices 300 are synchronized, without an offset in time therebetween. The synchronization is achieved, for example, by supplying gating signals to turn ON or OFF the IGBTs 321 of all multiple power supply devices 300 at the same time, e.g., in response to a rising edge of a synchronization pulse of the synchronization signal common to all multiple power supply devices 300.

Figure 4:
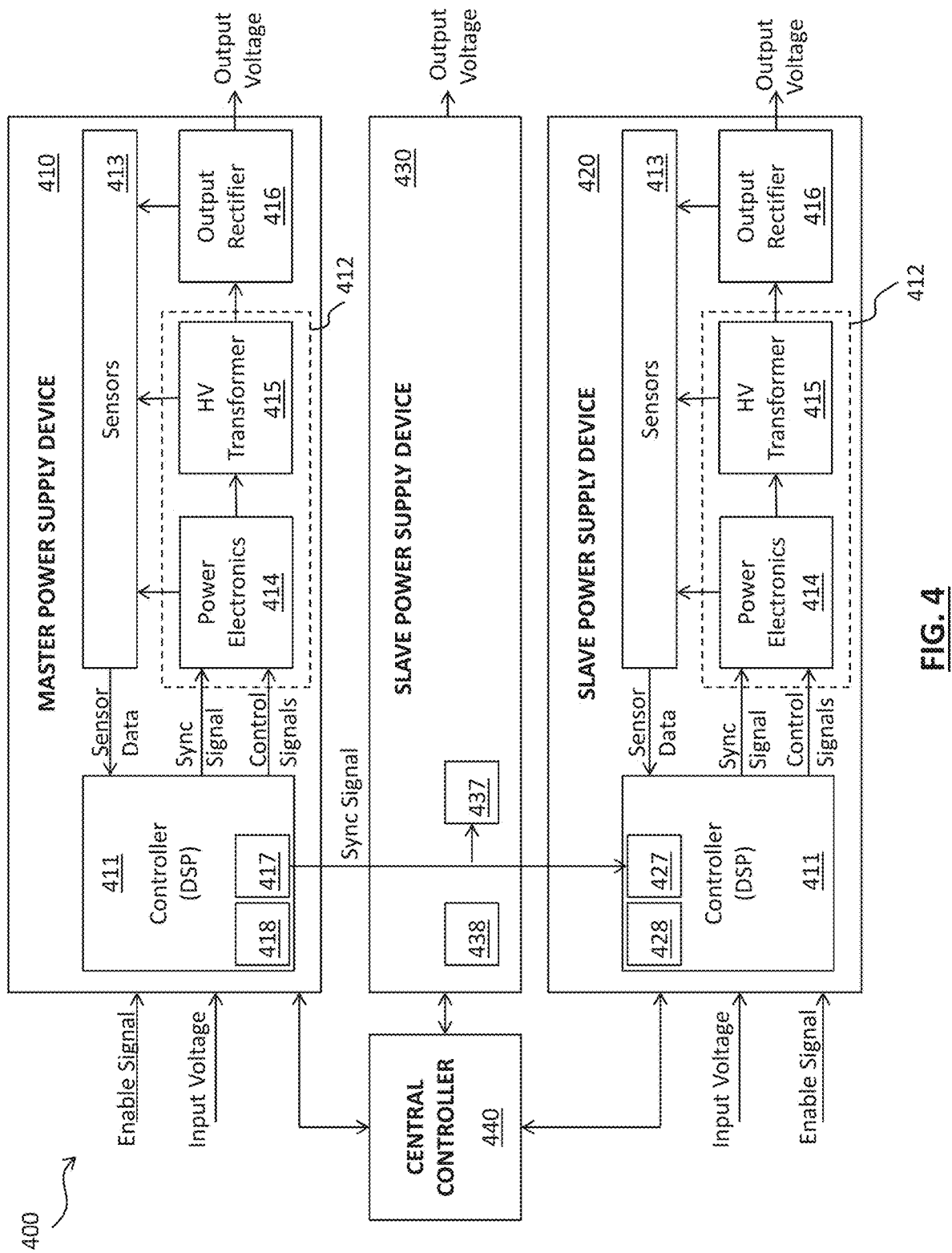
FIG. 4 is a block diagram of a system for coalescence of a multi-phase liquid mixture, in accordance with some embodiments.

FIG. 4 is a block diagram of a system 400 for coalescence of a multi-phase liquid mixture, in accordance with some embodiments. The system 400 includes a plurality of power supply devices 410, 420, 430, and a central controller 440. The central controller 440 is a controller as described with respect to FIG. 6. In at least one embodiment, the central controller 440 is a computer or a server, e.g., a cloud server.

In some embodiments, the power supply device 410 corresponds to the power supply device 110, and the power supply devices 420, 430 correspond to the power supply device 120. The power supply devices 410, 420, and 430 here have similar configurations. The power supply device 410 is described in detail herein. The description of the power supply device 410 also applies to the power supply devices 420, 430, unless indicated otherwise. For simplicity, various components of the power supply device 430 are omitted in FIG. 4.

The power supply device 410 includes a controller 411, a power conversion circuit 412, and a plurality of sensors 413. In an example configuration, the power conversion circuit 412 and the controller 411, e.g., a microprocessor, are incorporated in the same board, e.g., a printed circuit board (PCB). In another example configuration, the power conversion circuit 412 and the controller 411 are formed in different PCBs. The PCBs are coupled to each other and are accommodated inside the same, common housing of the power supply device 410. In at least one embodiment, the controller 411 corresponds to controller 141 described with respect to FIG. 1, and/or the DSP described with respect to FIG. 3. The power conversion circuit 412 includes power electronic circuitry 414 and a high voltage (HV) transformer 415. In at least one embodiment, the power electronic circuitry 414 includes a rectifier, a modulator and a chopper as described with respect to FIG. 1 and/or FIG. 3, whereas the HV transformer 415 corresponds to the transformer 36 and/or transformer 330. The HV transformer 415 due to its high operation voltage is arranged in a housing filled with oil. One or more components of the power electronic circuitry 414, e.g., an inductor, may also be arranged in the oil-filled housing. Other components of the power electronic circuitry 414 are dry electronics. The sensors 413 are distributed at various components of the power supply device 410 to collect sensor data and provide the collected sensor data to the controller 411. Examples of sensor data include, but are not limited to, voltage and/or current feedbacks from one or more of the input voltage, power electronic circuitry 414, HV transformer 415 and output rectifier 416, oil temperature and/or pressure and/or level in the oil-filled housing, temperatures of the dry electronics of the power electronic circuitry 414, states of an output switch corresponding to the output switch 350, etc. In the example configuration in FIG. 4, the power supply device 410 includes an output rectifier 416 as described with respect to FIG. 1 and or FIG. 3. In at least one embodiment, the output rectifier 416 is omitted. The controller 411 is configured to generate control signals (e.g., gating signals) to control the power electronic circuitry 414 to generate an output voltage in accordance with operation parameters supplied from the central controller 440 and in synchronization with a synchronization signal, as described with respect to FIG. 1 and/or FIG. 3. An enable signal is input to the power supply device 410 to enable the power supply device 410 for operation, or to disable or shut down the power supply device 410. In at least one embodiment, the enable signal is a local signal triggered on-site, e.g., by a human operator. In at least one embodiment, the enable signal is a remote control signal provided, for example, by the central controller 440. This description of the power supply device 410 is also applicable to the other power supply devices 420, 430. The output voltages from the power supply devices 410, 420, 430 are supplied to the corresponding electrodes in the same vessel for coalescence of a multi-phase liquid mixture in the vessel.

One of the power supply devices 410, 420, 430 is configured as a master power supply device, whereas the other power supply devices are configured as slave power supply devices. In the example configuration in FIG. 4, the power supply device 410 is configured as a master power supply device, whereas the power supply devices 420, 430 are configured as slave power supply devices. The controller 411 of the master power supply device 410 generates a synchronization signal and sends the generated synchronization signal to the other controllers 411 of the slave power supply devices 420, 430, via corresponding network and/or I/O interfaces 417, 427, 437. All controllers 411 of the master and slave power supply devices control the respective power electronic circuits 414 to generate respective output voltages in synchronization with the synchronization signal generated by the controller 411 of the master power supply device 410.

In at least one embodiment, the master status of the power supply device 410 is indicated by an indicator 418 stored in a register, or firmware, or memory of the controller 411. Similarly, the slave status of each of the power supply devices 420, 430 is indicated by a corresponding indicator 428, 438 stored in a register, or firmware, or memory of the corresponding controller 411 of the power supply device 420, 430. In some embodiments, one or more of the indicators 418, 428, 438 is/are set by the manufacturer the power supply devices 410, 420, 430, and/or set by an operator when the power supply devices 410, 420, 430 are deployed and connected to corresponding electrodes in a vessel, and/or remotely set by the central controller 440.

In at least one embodiment where the central controller 440 remotely sets the master or slave status for each of the power supply devices 410, 420, 430, the central controller 440 communicates with the power supply devices 410, 420, 430, via a network and corresponding network interfaces of the central controller 440 and the controllers 411 of the power supply devices 410, 420, 430. Examples of network interfaces include, but are not limited to, Modbus interfaces, TCP/IP interfaces, Ethernet IP interfaces, or wireless network interfaces/transceivers. The central controller 440 assigns, via the network, a unique network address, e.g., an IP address, to each of the controllers 411. Using the assigned unique network address, the central controller 440 sends a command to each of the controllers 411 causing the controller 411 to change the corresponding indicator 418, 428, 438 to reflect the commanded master or slave status.

Remotely reconfiguring master and slave power supply devices is also possible in at least one embodiment. For example, the controller 411 of the master power supply device 410 detects or captures an event, such as a fault or abnormality, from the sensor data provided by the sensors 413, and reports the detected event to the central controller 440. Alternatively, the central controller 440 detects such an event from the sensor data forwarded from the power supply device 410 via the corresponding network interfaces, or from non-responsiveness of the power supply device 410. Upon detection of an event indicating the inability of the power supply device 410 to continue to operate normally, or to operate as a master power supply device, the central controller 440 can send a command to the controller 411 of the power supply device 410 to cause shutdown of the power supply device 410, or to reconfigure the power supply device 410 as a slave power supply device by changing the indicator 418 accordingly. The central controller 440 can also send another command to one of the current slave power supply devices, e.g., the power supply device 420, to reconfigure the power supply device 420 as new master power supply device, by changing the indicator 428 accordingly.

Examples of events such as malfunctions or faults or abnormality detectable from the sensor data provided by the sensors 413 arranged at various stages of power conversion in each of the power supply devices 410, 420, 430 are described herein. In an example, the controller, 411 upon sensing voltage swings beyond a predetermined level in the primary winding of the HV transformer 415, automatically shuts down the power supply device, thereby preventing damage to the power electronic circuitry 414. In a further example, whenever an instantaneous rise in the current (amperage) in the load (i.e., the multi-phase liquid mixture) is detected, corresponding for example to a static discharge, the controller 411 immediately cuts back on the voltage being applied, e.g., by modifying the operation parameters, thereby protecting the power electronic circuitry 414. A percentage rise in the current is a parameter that can be set or adjusted by the user to allow minimizing false detection. In another example, the load current is monitored by the controller 411 to determine whether current polarity imbalance due to cross-talk between power supply devices or unequal positive/negative loading exists. Upon detection of current polarity imbalance or unequal positive/negative loading, the controller 411 limits the output voltage to safe level e.g., by modifying the operation parameters, and notifies the central controller 440 of the problem.

In yet another example, in case of an event, such as short circuit, power failure or phase loss, the controller 411 not only shuts down the voltage being applied but also logs all sensor data within a predetermined period (e.g., 250 ms) before and after the event to aid in troubleshooting. In an embodiment, when a monitored current rises beyond a predetermined threshold indicating a beginning of a potential short-circuit event, the controller 411 controls one or more sensors to capture data at an increased data capturing rate, and when the monitored current drops below a predetermined threshold indicating a peak of the short-circuit event has passed, the controller 411 controls the one or more sensors to return to a lower, normal data capturing rate. As a result, the entire event including both periods before and after the short-circuit peak is captured at a higher data capturing rate and/or with a higher resolution, to assist in data analysis and/or troubleshooting. In a further embodiment, in case of an event, the controller 411 increases the amount of data to be recorded for a full capture of the event at a high resolution. For instance, in a normal operation of the power supply device, the controller 411 receives data from one or more sensors at every clock pulse, but only records the received data at, e.g., every 5 clock pulses. When an event is about to occur, e.g., a monitored current rising beyond a predetermined threshold, the controller 411 begins recording the received data at every clock pulse until the event has passed, e.g., the monitored current drops below the predetermined threshold. The increased amount of data recorded during the event, including both before and after time periods, is helpful for troubleshooting.

In a further example, the controller 411 generates an alarm or warning upon detecting one or more events including, but not limited to, overcurrent and arc counter, excessive temperature rise at an IGBT during a predetermined time period at a given chopper condition, excessive oil temperature increase during a predetermined time period at a given output voltage level, excessive number/severity of incoming line overvoltage events, excessive number/severity of incoming line undervoltage events, excessive reduction or loss of heat-dissipating fan rpm for the power electronics, remaining useful life of IGBTs below a predetermined level etc. In at least one embodiment, the controller 411 sends one or more of sensor data, alarm and detected event/fault information to the central controller 440, or logs one or more of sensor data, alarm and detected event/fault information in a memory of the controller 411 for on-site or remote access and trouble shooting.

As described herein, in one or more embodiments where a plurality of power supply devices are deployed to supply voltages to corresponding electrodes arranged in a vessel, one of the power supply devices is configured to generate a synchronization signal for all power supply devices. The controller of each of the power supply devices controls a timing of generation of an output voltage from the power supply device in accordance with the synchronization signal output by one of the power supply devices. Therefore, it is possible to prevent cross talk between the power supply devices through the common load, i.e., the multi-phase liquid mixture to be treated in a vessel. As a result, it is possible to prevent damage to the power supply devices and/or to improve performance of treatment to the multi-phase liquid mixture.

In an aspect, the provision of a power supply device with an integrated microprocessor, which controls a power conversion circuit of the power supply device to generate an output voltage in accordance with one or more operating parameters suitable for causing coalescence of a multi-phase liquid mixture, is a unique feature compared to other approaches.

In a further aspect, the configuration and/or programming of the microprocessor to receive data from various sensors to capture events for data analysis and/or troubleshooting, to monitor the voltage and/or current at every stage of voltage conversion in the power conversion circuit, and to monitor the pressures and/or temperatures at various locations in the power supply device, is another unique feature compared to other approaches.

In yet another aspect, although some embodiments described herein are directed to a power conversion circuit in which an AC-DC conversion is performed, in other embodiments such AC-DC conversion is omitted. In other words, an AC power supply voltage is directly modulated by the power conversion circuit, under control of a microprocessor, to provide an output voltage suitable for causing coalescence of a multi-phase liquid mixture.

Figure 5:
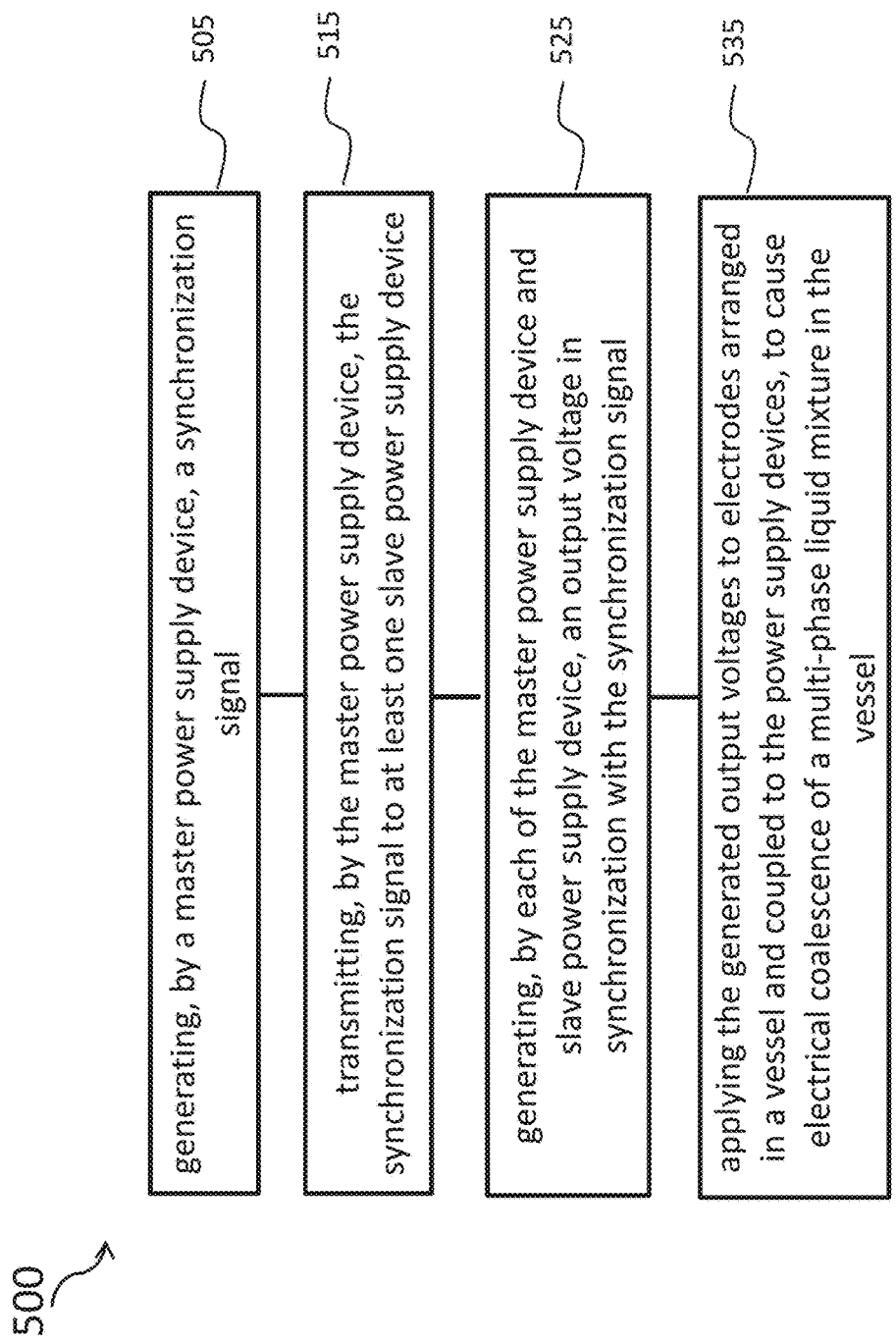
FIG. 5 is a flow chart of a method for coalescence of a multi-phase liquid mixture, in accordance with some embodiments.

FIG. 5 is a flow chart of a method 500 for coalescence of a multi-phase liquid mixture, in accordance with some embodiments. The method 500 may be performed in any of systems 100, 400, and/or by one or more of power supply devices 110, 120, 300, 410, 420, 430, and/or under control of one or more of controllers 141, 142, 411, 440.

At operation 505, a master power supply device generates a synchronization signal. For example, the power supply device 110 or 410 generates a synchronization signal, as described with respect to FIG. 1 or FIG. 4.

At operation 515, the master power supply device transmits the synchronization signal to at least one slave power supply device. For example, the power supply device 110 or 410 transmits the generated synchronization signal to the power supply device 120 or power supply device 420/430, as described with respect to FIG. 1 or FIG. 4.

At operation 525, each of the master power supply device and slave power supply device generates an output voltage in synchronization with the synchronization signal. For example, each of the power supply devices 110 and 120, or each of the power supply devices 410, 420 and 430, generates an output voltage in synchronization with the synchronization signal, as described with respect to FIG. 1 or FIG. 4. An example of generating an output voltage in synchronization with the synchronization signal is described with respect to FIG. 3.

At operation 535, the generated output voltages are applied to electrodes arranged in a vessel and coupled to the power supply devices, to cause or enhance coalescence of a multi-phase liquid mixture in the vessel, for example, as described with respect to FIG. 1.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

FIG. 6 is a block diagram of a controller, in accordance with some embodiments.

The controller 600 comprises a hardware processor 602, a storage device 604 including at least one non-transitory, computer readable storage medium, a bus 608, an I/O (input/output) interface 610, and a network interface 612. The processor 602 is coupled with the storage device 604, the I/O interface 610, and the network interface 612 via the bus 608. The network interface 612 is connectable to a network 614, so that the processor 602 and the storage device 604 are communicable with other devices via the network 614. The processor 602 is configured to execute computer program instructions encoded in the storage device 604 and/or to access data stored in the storage device 604 to cause the controller 600 to perform one or more functionalities and/or operations described with respect to FIGS. 1-5.

The processor 602 includes one or more of a central processing unit (CPU), a multi-processor, a distributed processing system, an application specific integrated circuit (ASIC), and/or a suitable hardware processing unit.

The storage device 604 includes one or more of an electronic, magnetic, optical, electromagnetic, infrared, and/ or a semiconductor system (or apparatus or device) for storing instructions and/or data in a non-transitory manner. For example, the storage device 604 includes a semiconductor or solid-state memory, a magnetic tape, a removable computer diskette, a random access memory (RAM), a read-only memory (ROM), a rigid magnetic disk, and/or an optical disk. As examples of optical disks, storage device 604 includes a compact disk-read only memory (CD-ROM), a compact disk-read/write (CD-R/W), and/or a digital video disc (DVD).

The I/O interface 610 is circuitry that is connectable with external circuitry. For example, the I/O interface 610 includes one or more of a keyboard, keypad, mouse, trackball, trackpad, cursor direction keys, card reader, communication port, display, signal light, printer and/or audio device for communicating information to/from the processor 602. In an embodiment, the I/O interface 610 is omitted.

The network interface 612 is circuitry that allows the controller 600 to communicate with the network 614, to which one or more other controllers and/or equipment are connected. For example, the network interface 612 includes one or more of wireless network interfaces such as BLUETOOTH, WIFI, WIMAX, GPRS, or WCDMA; or wired network interface such as Modbus, TCP/IP, ETHERNET, USB, or IEEE-1394. In an example, the network interface 612 is omitted.

By being configured to execute some or all of functionalities and/or operations described with respect to FIGS. 1-5, the controller 600 enables the realization of one or more advantages and/or effects described with respect to FIGS. 1-5.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A power supply device, comprising:
 a power conversion circuit configured to generate an output voltage from an input voltage; and
 a microprocessor controller coupled to the power conversion circuit and configured to control the power conversion circuit to generate the output voltage and apply the output voltage to the multi-phase liquid mixture, wherein
 the microprocessor controller is configured to control generation of the output voltage in accordance with a digital synchronization signal, and
 the microprocessor controller is further configured to generate the synchronization signal at a base frequency and transmit the synchronization signal to a further power supply device, or
 receive the synchronization signal from another power supply device.

2. The power supply device of claim 1, wherein
 the power conversion circuit includes a plurality of switches, and
 the microprocessor controller is configured to set the plurality of switches to an ON or OFF state in synchronization with the digital synchronization signal.

3. The power supply device of claim 2, wherein
 the power conversion circuit includes:
 a rectifying circuit configured to rectify the input voltage to obtain a rectified voltage,
 a modulating circuit coupled to the rectifying circuit, and configured to modulate the rectified voltage in accordance with a first frequency to obtain a modulated voltage, and
 a chopper circuit coupled to the modulating circuit, and configured to chop-up the modulated voltage in accordance with a second frequency higher than the first frequency to obtain a chopped-up voltage,
 the chopper circuit includes the plurality of switches, and is configured to chop-up the modulated voltage, by turning ON or OFF the plurality of switches, in synchronization with the digital synchronization signal.

4. The power supply device of claim 3, wherein
 the power conversion circuit further includes:
 a transformer coupled to the chopper circuit, and configured to step-up the chopped-up voltage to obtain the output voltage.

5. The power supply device of claim 1, wherein
 the digital synchronization signal comprises a plurality of synchronization pulses periodically generated or received by the microprocessor controller.

6. The power supply device of claim 1, wherein
 the microprocessor controller includes a programmable memory for storing a master setting for operating the power supply device as a master power supply device or a slave setting for operating the power supply device as a slave power supply device,
 the microprocessor controller is configured to generate the digital synchronization signal and transmit the digital synchronization signal to another power supply device in response to storing the master setting in the programmable memory, or
 the microprocessor controller is configured to receive the digital synchronization signal from another power supply device in response to storing the slave setting in the programmable memory.

7. The power supply device of claim 6, wherein
 the microprocessor controller is configured to store the master setting or the slave setting in the programmable memory in response to an external signal.

8. A system, comprising:
 a plurality of power supply devices each configured to generate an output voltage from an input voltage for applying the output voltage to a multi-phase liquid mixture,
 wherein
 the plurality of power supply devices comprises a master power supply device and at least one slave power supply device,
 the master power supply device is configured to
 generate a digital synchronization signal at a base frequency,
 control generation of the output voltage from the master power supply device in accordance with the digital synchronization signal, and
 transmit the digital synchronization signal to the at least one slave power supply device, and
 the at least one slave power supply device is configured to
 receive the digital synchronization signal from the master power supply device, and
 synchronize generation of the output voltage from the at least one slave power supply device with the generation of the output voltage from the master power supply device in accordance with the received digital synchronization signal.

9. The system of claim 8, further comprising:
a vessel; and
a plurality of electrodes in the vessel, each of the plurality of electrodes coupled to a corresponding power supply device among the plurality of power supply devices,
wherein the vessel comprises:
an inlet for supplying the multi-phase liquid mixture into the vessel;
a first outlet for discharging a first component of the multi-phase liquid mixture; and
a second outlet for discharging a second component of the multi-phase liquid mixture.

10. The system of claim 8, wherein
the digital synchronization signal comprises a plurality of synchronization pulses periodically generated by the master power supply device.

11. The system of claim 8, further comprising:
a central microprocessor controller coupled to the plurality of power supply devices, and configured to cause
one of the plurality of power supply devices to be configured as the master power supply device, and
other of the plurality of power supply devices to be configured as the at least one slave power supply device.

12. The system of claim 11, wherein
the central microprocessor controller is configured to, upon detection of a predetermined event in the master power supply device, cause
the master power supply device to be shut down or reconfigured as a slave power supply device, and
a slave power supply device of the at least one slave power supply device to be reconfigured as a successor master power supply device.

13. The system of claim 11, wherein
the central microprocessor controller is configured to transmit operating parameters to the plurality of power supply devices, and
the plurality of power supply devices is configured to apply the operating parameters to generate the corresponding output voltages in synchronization with the synchronization signal, so that the output voltages are the same with no offset in time between the output voltages, or with an offset at or below a predetermined value.

14. The system of claim 13, wherein
the operating parameters comprise at least one of
a base frequency of the output voltage generated by each of the plurality of power supply devices,
a modulation frequency of the output voltage,
a shape of a waveform of the output voltage,
a maximum amplitude of the output voltage, and
a minimum amplitude of the output voltage.

15. The system of claim 11, wherein
each of the central controller and the plurality of power supply devices has a network interface coupled to a network for data exchange between the central microprocessor controller and the plurality of power supply devices, and
each of the network interfaces comprises a Modbus interface, a TCP/IP interface, or an Ethernet IP interface.

16. The system of claim 8, wherein
each of the plurality of power supply devices includes:
a plurality of switches, and
a controller configured to set each switch to an ON state or an OFF state in synchronization with the digital synchronization signal, so that corresponding switches of the plurality of power supply devices are in the ON or OFF state at the same time.

17. The system of claim 16, wherein
each of the plurality of power supply devices includes:
a rectifying circuit configured to rectify the input voltage to obtain a rectified voltage,
a modulating circuit coupled to the rectifying circuit, and configured to modulate the rectified voltage in accordance with a first frequency to obtain a modulated voltage,
a chopper circuit coupled to the modulating circuit, and configured to chop-up the modulated voltage in accordance with a second frequency higher than the first frequency to obtain a chopped-up voltage, and
a transformer coupled to the chopper circuit, and configured to step-up the chopped-up voltage to obtain the output voltage, and
the chopper circuit includes the plurality of switches, and is configured to chop-up, by setting each switch to the ON state or the OFF state, the modulated voltage in synchronization with the digital synchronization signal.

18. A method, comprising:
generating, by a master power supply device among a plurality of power supply devices, a digital synchronization signal at a base frequency;
transmitting, by the master power supply device, the digital synchronization signal to at least one slave power supply device among the plurality of power supply devices;
generating, by each of the master power supply device and the at least one slave power supply device, an output voltage in synchronization with the digital synchronization signal; and
applying the generated output voltages to a plurality of electrodes arranged in a vessel and coupled to the plurality of power supply devices, respectively, to create an electric field in a multi-phase liquid mixture within the vessel.

19. The method of claim 18, further comprising:
remotely configuring
one of the plurality of power supply devices as the master power supply device, and
another of the plurality of power supply devices as the at least one slave power supply device.

20. The method of claim 18, further comprising:
upon detection of a predetermined event in the master power supply device,
remotely controlling the master power supply device to be shut down or reconfigured as a slave power supply device, and
remotely reconfiguring a slave power supply device of the at least one slave power supply devices as a successor master power supply device.

* * * * *